United States Patent [19]

Macovski

[11] 3,772,457

[45] Nov. 13, 1973

[54] SONIC IMAGE TRANSDUCER USING A STORAGE CAMERA

[75] Inventor: Albert Macovski, Palo Alto, Calif.

[73] Assignee: American Express Investment Management Company, San Francisco, Calif.

[22] Filed: Mar. 29, 1971

[21] Appl. No.: 128,753

[52] U.S. Cl. ........ 178/6.8, 73/67.5 H, 178/DIG. 18, 356/106

[51] Int. Cl. .......... H04n 7/18

[58] Field of Search .......... 73/67.5 R, 67.5 H, 73/69; 340/5 H; 350/3.5; 178/DIG. 18; 356/106

[56] References Cited

UNITED STATES PATENTS

| | | | |
|---|---|---|---|
| 3,533,675 | 10/1970 | Brooks | 356/106 R |
| 3,535,024 | 10/1970 | Webb | 356/106 R |
| 3,535,041 | 10/1970 | Webb | 356/106 R |

OTHER PUBLICATIONS

Coherent Optical Detection of Ultrasonic Images using Electronic Scanning – Green, Macovski, Ramsey – App. Physics Letters – Vol. 16 No. 7 – April 70– pp. 265–267

Korpel, Whitman – Visualization of a Coherent Light Field by Heterodyning with a Scanning Laser Beam – Applied Optics – Vol. 8 No. 8 – Aug. 1969 – pp. 1,577–1,580

Massey – An Optical Heterodyne Ultrasonic Image Converter – Proc. of IEEE – Vol. 56 No. 12 Dec. 1968 – pp. 2,157–2,161

*Primary Examiner*—Robert L. Griffin
*Assistant Examiner*—Joseph A. Orsino, Jr.
*Attorney*—Townsend and Townsend

[57] ABSTRACT

An acoustic to optical image converting system of the type in which an acoustic field originating from an object insonified by a sonic signal generating source is impressed on a reflective vibrating surface and illuminated with an object beam of coherent light and in which the reflected object beam is combined with a reference beam of coherent light to generate an optical interference pattern corresponding to the acoustic field. A pulsed laser and an interferometer are used to generate the object beam and reference beam and selected interference patterns derived from different phase combinations of the laser beams and sonic signals are projected on the face of the storage type television camera. Outputs from the television camera corresponding to specified image components are electronically processed by a variety of system embodiments with and without video storage devices to filter the desired image information and reconstruct an image or hologram of the original object. The sonic source can similarly be pulsed in co-ordination with the pulsed laser to increase the sensitivity of the image system.

24 Claims, 8 Drawing Figures

INVENTOR.
ALBERT MACOVSKI
BY
Townsend and Townsend
ATTORNEYS

INVENTOR.
ALBERT MACOVSKI
BY
Townsend and Townsend
ATTORNEYS

INVENTOR.
ALBERT MACOVSKI
BY
Townsend and Townsend
ATTORNEYS

INVENTOR.
ALBERT MACOVSKI
BY
Townsend and Townsend
ATTORNEYS

SONIC IMAGE TRANSDUCER USING A STORAGE CAMERA

This invention relates to improved systems and methods for visualizing acoustics images, i.e., systems and methods for converting acoustic wave fields or "images" to corresponding optical images. The invention has application in medical diagnostics, non-destructive testing, underwater viewing, acoustic holography, and sonic imaging generally.

In U.S. Pat. application Ser. No. 864,351 entitled "SONIC TRANSDUCER", now U.S. Pat. No. 3,594,717, and in U.S. Pat. application Ser. No. 7,486 entitled "ACOUSTIC TO OPTICAL IMAGE CONVERTER", now U.S. Pat. No. 3,716,826 there are described a variety of acoustic to optical image converting systems of the type in which an acoustic field originating from an object insonified by a sonic signal generating source is impressed on a reflective deformable surface. A laser and an interferometer are used to generate object and reference beams of coherent light and the object beam is directed to illuminate the reflective vibrating surface. The reflected object beam and reference beam of coherent light are recombined to produce an optical interference pattern corresponding to the acoustic field. In the systems described in those patent applications, the interference pattern resulting from continuous illumination of the acoustic "image" impressed on the reflective vibrating surface is scanned using an image dissector-type television camera. An optical modulator interposed in the reference beam path is driven by a signal generator to cyclically temporally offset the frequency of the reference light beam through phase modulation. The image dissector scans the resulting interference pattern and thereby generates a signal carrier upon which is superimposed or modulated the desired image information in addition to undesired incidental vibrations. Undesired signal components are eliminated by appropriate filtering and the desired signal component is extracted and demodulated or detected for display on a cathode ray tube.

The systems described in the above referenced patent applications are adapted for use with image dissector-type television cameras which have a much lower sensitivity than the storage-type cameras, such as vidicons and orthicons. It is therefore the object of the present invention to provide improved acoustic to optical image converting systems with increased sensitivity using storage type television cameras for processing the optical interference patterns obtained by recombination of the object and reference beams.

The present invention thus generally contemplates a system for visualizing acoustic images of the type in which an acoustic field originating from an object insonified by a sonic signal generating source is impressed on a reflective vibrating surface and illuminated with an object beam of coherent light. The reflected object beam is combined with the reference beam of coherent light to generate an optical interference pattern. The invention contemplates the use of a pulsed laser for temporally "capturing" the sonic field displayed at the reflective vibrating surface. An optical modulator is interposed in the reference beam path for controlling and modulating the phase of the reference beam. According to the invention, an optical image of the original object is reconstructed from output signals at the vidicon camera representing interference pattern image components at the face of the vidicon camera under controlled conditions of sonic excitation phase and reference beam phase. The output signals from the vidicon camera representing the image components are filtered, processed and combined to provide a signal which is applied to an optical display such as a cathode ray tube for reconstructing an image from the original object.

According to a first aspect of the invention the pulsed laser is synchronized with the sonic signal generating source and controlled so that it can be turned on either during a positive or negative peak of the sonic signal. Each of the laser pulses has a duration of a small fraction of a cycle of the insonifying signal. In one embodiment the storage-type television camera is positioned to receive on the camera target the pulsed interference patterns produced by combined object and reference beams and the output of the television camera is coupled to a video storage device. First and second difference amplifiers are coupled to the output of the video storage device and are in turn coupled to first and second multipliers. An adder adds the output of the two multipliers for application to an optical display such as a cathode ray tube display.

In one of the methods of acoustic to optical image conversion this aspect of the invention contemplates pulsing the object beam and illuminating the acoustic image impressed on the reflective vibrating surface with a first pulse to produce a first intensity pattern which is projected on the target of the storage-type television camera. Th first intensity pattern is read out of the TV camera providing a first signal which is stored in the video storage device, which may be, for example, a magnetic disc. The acoustic image is then illuminated with a second object beam pulse during a phase of the sonic signal opposite that during illumination by the first pulse to produce a second intensity pattern. The second intensity pattern projected on the TV camera face plate is read out to form a second signal stored in the video storage device. The phase of the reference beam is then shifted by an amount $\pi/2$ by applying a constant signal to the otical modulator in the reference beam path and the acoustic image is illuminated with a third object beam pulse providing a third intensity pattern at the camera face plate. This intensity pattern is read out providing a third signal stored in the video storage device. Finally, the acoustic image is illuminated with the fourth object beam pulse during a phase of the insonifying signal opposite that during illumination by the third pulse to form a fourth intensity pattern which is read out of the television camera to produce a fourth signal. Thus, four signals corresponding to four intensity patterns or image components are available for reconstructing an optical image of the original object. This image construction is accomplished by generating a first difference signal corresponding to the difference between the first and second signals, squaring the first difference signal, generating a second difference signal corresponding to the difference between the third and fourth signals, and squaring the second difference signals. The sum of squares of the first and second difference signals is generated by the adder and the adder output corresponds to the envelope signal containing desired image information. This final signal is supplied to an optical display such as a cathode ray tube display.

In another embodiment of this first aspect of the invention, the video disc storage device is not used and temporary storage and summation of interference patterns and components is accomplished first by the target of the vidicon or other storage type television camera and second by the screen of a cathode ray tube display. In this embodiment of the invention the output of the storage-type television camera is coupled to a high pass filter in turn coupled to a squaring circuit. The output of the squaring circuit is applied to a cathode ray tube display. In the method of this embodiment the invention contemplates generating a first laser pulse having a duration of a fraction of the cycle of the insonifying signal and illuminating the acoustic image to form a first intensity pattern at the camera face plate. The path length of the reference beam is shifted by half a wavelength by applying a constant signal to the optical modulator in the reference beam path and the acoustic image is illuminated with a second laser pulse at a time when the insonifying signal is of opposite polarity thereby generating a second intensity pattern on the camera face plate. The first and second intensity patterns are summed at the camera face plate and read out to provide a first signal corresponding to the sum of the first and second intensity patterns. The AC component of the first signal is extracted by a high pass filter, squared, and applied to a cathode ray tube display. The reference beam is then shifted 90° and the same operation is repeated the third and fourth laser pulses providing third and fourth intensity patterns summed at the face of the television camera. The AC component of the television camera output is again separated, squared and applied to the cathode ray tube so that the two squared signals are summed at the face of the cathode ray tube display. Thus, according to this method various interference patterns, image components and corresponding component signals, necessary to reconstruct an optical image of the acoustic ray field, are processed using the target of the television camera and the screen of the cathode ray tube display for temporary storage and summing purposes.

According to a second aspect, the invention contemplates illuminating the acoustic field impressed at the reflective vibrating surface with an object beam of coherent light over many cycles of the sonic signal. In one embodiment this aspect of the invention contemplates coupling the output of the storage type television camera through a high pass filter, squaring circuit, and adder for application to an optical display such as a cathode ray tube display. In the method of this embodiment the invention contemplates modulating the reference beam by cyclically temporally offsetting the phase of the reference beam at a frequency equal to the frequency of the insonifying signal so that the interference pattern resulting from the combined object and reference beam is superimposed or modulated on a temporal frequency carrier. The resulting interference pattern is projected on the target of a storage type television camera and the intensity patterns are integrated on the face of the camera over many cycles of the insonifying signal. The integrated pattern is read out generating a first signal stored in the video storage device. The phase of the insonifying signal is shifted by 90° and the previous operation repeated by integrating intensity patterns on the camera face plate over many cycles of the insonifying signals producing a second integrated pattern which is read out of the camera to provide a second signal. The first and second signals representing the first and second integrated patterns are squared and added to provide a signal corresponding to the envelope signal containing desired image information.

In another embodiment the foregoing arrangement of components is modified by removing the video storage device and the separate adder, and the method modified by temporarily storing and adding the first and second signals representing the first and second integrated patterns on a cathode ray tube screen display.

In yet another embodiment of this second aspect of the invention the interferometer for generating object and reference beams from the laser pulse beams is constructed and arranged to provide off-axis recombination of the object beam reflected from the acoustic image and the reference beam. The optical interference pattern corresponding to the acoustic image is thereby modulated on a spatial frequency carrier, whose frequency is determined by the angle between the recombined off-axis reference and object beams. The resulting interference pattern is integrated at the target of the storage-type television camera over many cycles of the sonic signal and read out to provide a signal having components corresponding to desired image information, the spatial carrier, and information about spurious vibrations. This signal is filtered and envelope detected to provide the envelope signal containing the desired image information. In a preferred form, envelope detection is accomplished by amplitude modulating a high frequency carrier with the television camera output, filtering a single side band of the modulated carrier, and detecting the filtered signal.

In each of the foregoing aspects and embodiments the invention contemplates increasing the sensitivity or signal to noise ratio of the sonic imaging system by pulsing the sonic source in addition to the laser. Pulsing the sonic excitation signal increases the intensity of displacement at the acoustic image displayed on the reflective surface. The sonic and laser pulses are coordinated, taking into account propagation times, so that the pulses are coincident at the reflective vibrating surface.

Other objects, features and advantages of the present invention will become apparent in the following specification and accompanying drawings.

Figure 4:
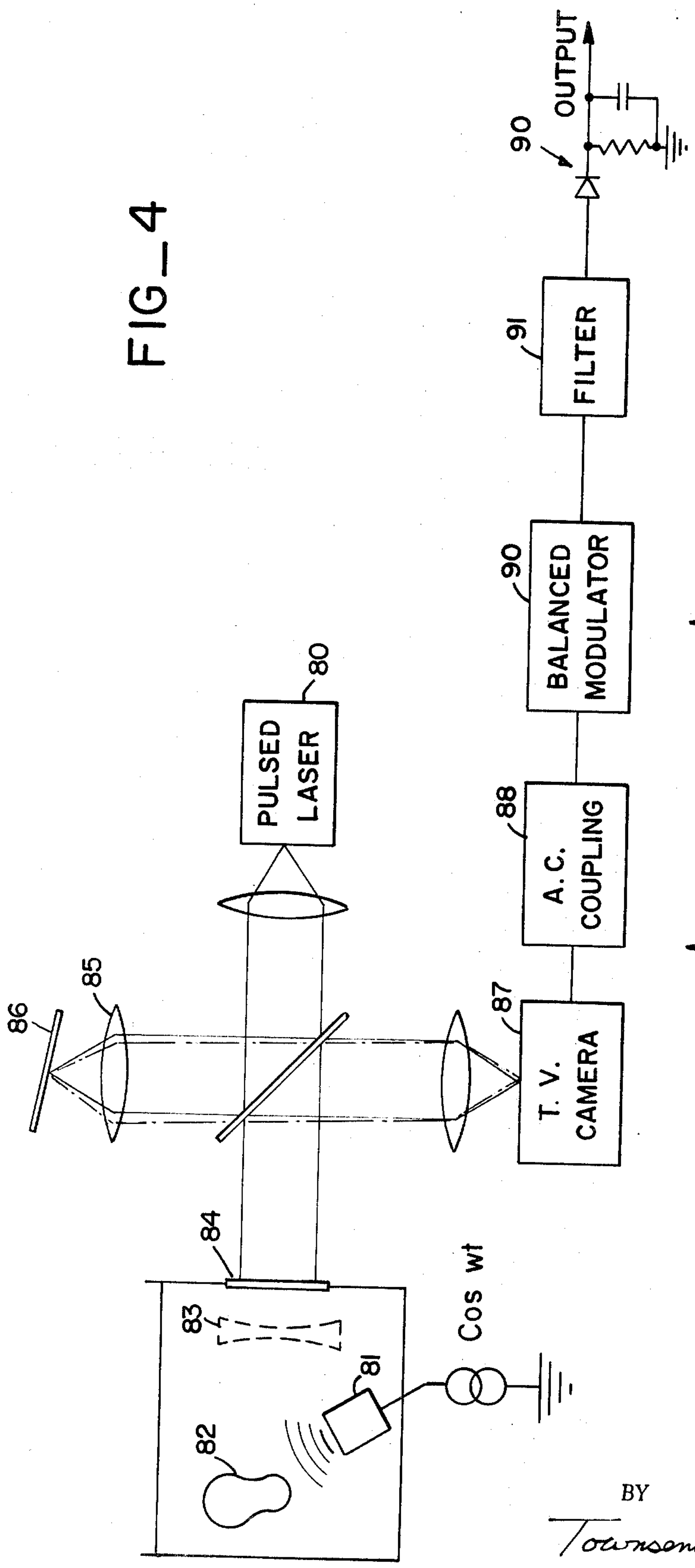
FIG. 4 is a block diagram of another acoustic to optical image converter using off axis recombination of the object in reference beams for generating a spatial frequency carrier.
Figures 4A, 4B, 4C, 4D:
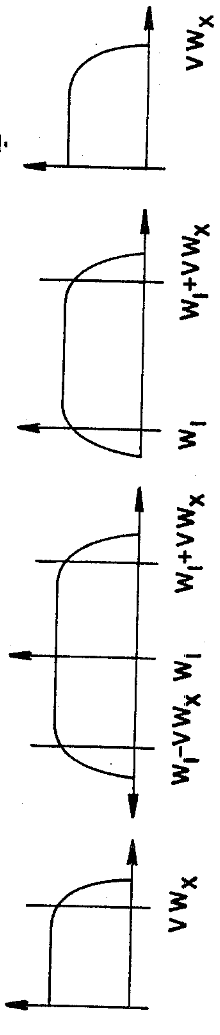

FIGS. **4*a* through 4*d* are graphs representing outputs from components of the block diagram in FIG. 4.**

Figure 1:
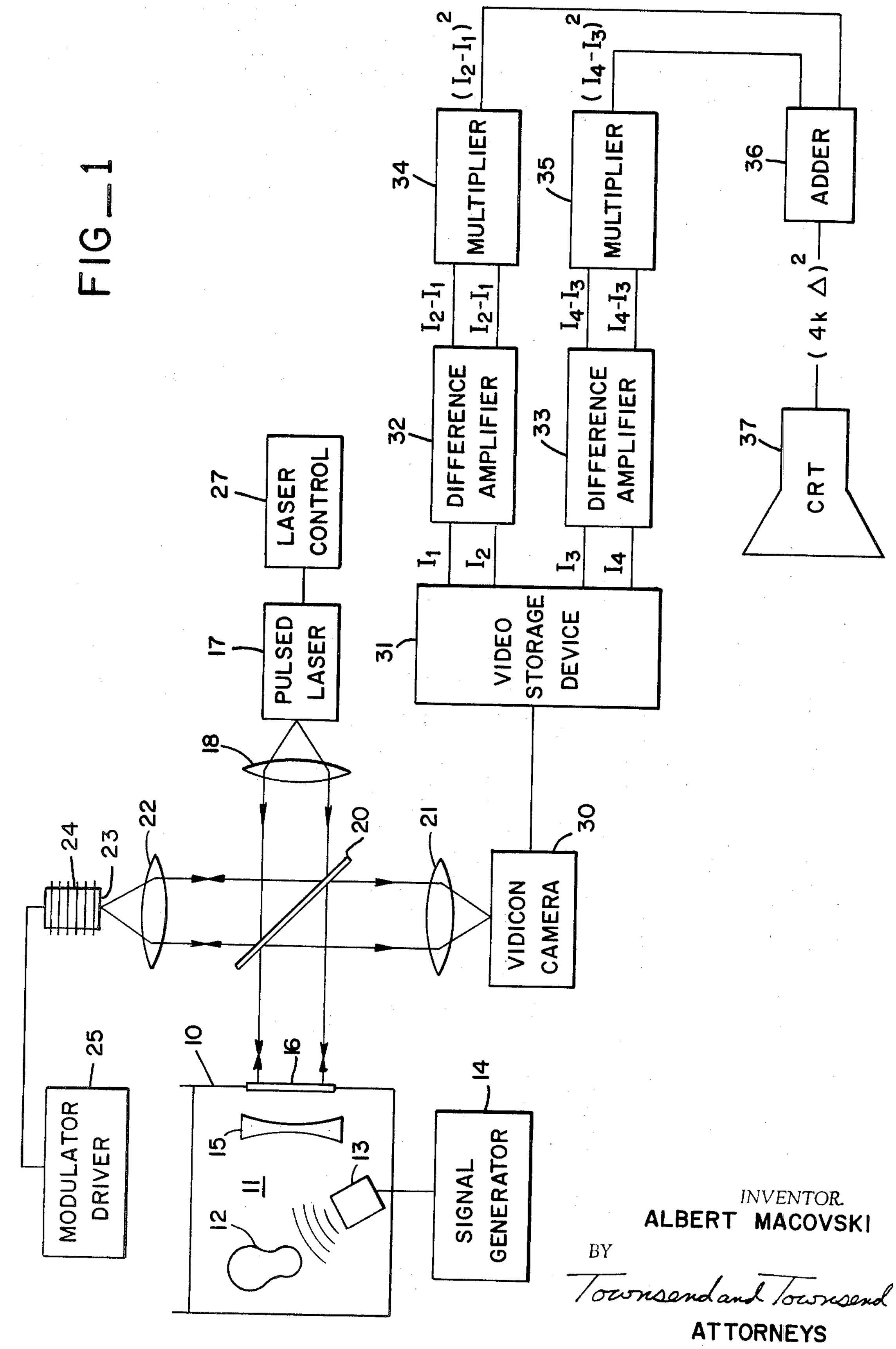
FIG. 1 is a block diagram of an acoustic to optical image converting system according to the first aspect of the invention using a video storing device.

In the acoustic optical image converting system illustrated in FIG. 1 a container 10 is filled with a suitable liquid 11 such as, for example, water, which serves as an acoustically transmissive medium, in which an object 12 is immersed. A transducer 13 disposed within the liquid 11 is driven by a signal generator or ultrasonic frequency driver 14 and "irradiates" or "illuminates" the object 12 with sound waves. The phrases "sonic generator," and "sonic signal" are used herein to include sound energy in both sonic and supersonic or ultrasonic ranges. The acoustic field emanating from object 12 is focused by an acoustic lens 15 to form an acoustic "image" on surface 16 of container 10. Surface 16 may be made of any suitable deformable, light reflecting material. Silvered Mylar, for example, has been found satisfactory.

A pulsed beam of coherent light from a pulsed laser 17 is directed through a lens 18 and half silvered mirror or beam splitter 20 on to the surface 16 to illuminate the pattern of deformations or vibrations across the surface 16 produced by the focused acoustic field within container 10. The pulsed beam of light illuminating surface 16, referred to herein as the object beam is reflected back to the beam splitter 20 and is imaged through lens 21 on to the target of a vidicon or other storage-type television camera. Part of the pulsed beam of light from laser 17 is reflected by the half silvered mirror or beam splitter 20 through a lens 22 on to a retro reflector 23 forming a reference beam. The reference beam is reflected back through the beam splitter and lens 21 onto the face of the television camera. The recombined object and reference beams form an interference pattern on the face of the camera incorporating information about the pattern of deformations on surface 16 and also spurious vibrations and pathlength vibrations.

The retro reflecting surface 23 is affixed to a stack of piezoelectric crystals 24 which can be driven by a voltage generator 25 to displace the phase of the reference beam. In the present example DC voltages are applied to displace the phase of the reference beam, i.e., change the length of the reference beam path by predetermined constant amounts.

The pattern of light occurring at the target of the vidicon camera includes not only the interference pattern due to motion of the surface 16 in response to the sonic field, but also interference patterns due to incidental variations in surface 16 and other spurious vibrations in the system. Therefore, the interference pattern describing the sonic field, i.e., the desired image information must be separated from incidental and spurious information encoded in the information pattern. To this end image reconstruction and processing is accomplished in the following manner.

The pulsed laser 17 under control of the laser control 27 is actuated to provide a first pulse having duration of only a fraction of the cycle of the sonic excitation signal from transducer 13 at a peak in the sonic excitation. The intensity I appearing on the camera face plate is given by the following equation, $$I = |U_1 + U_2|^2$$

where $$U_1 = e^{jkl}1(x,y)\, e^{j\theta}$$

and $$U_2 = e^{jk}\, [l_2(x,y) + 2\Delta]$$

The symbol $\theta$ represents the phase shift of the reference beam introduced by the modulator 24, $\Delta$is the sonic displacement $l_1(x,y)$ is the pathlength of the reference beam and $l_2(x,y)$ is the pathlength of the object beam. For very small values of $\Delta$ the intensity is given by the following equation:

$$I = +\cos[k(l_2 - l_1) - \theta] - 2k\Delta \sin[k(l_2 - l_1) - \theta]$$

In order to optically visualize the acoustic wave field impressed at surface 16 two intensity patterns $I_1$ and $I_2$ are first formed and scanned on the target of the vidicon camera with $\theta$, the phase shift introduced by modulator 24 in the reference pulse beam, being zero, i.e., no voltage is applied to the light modulator. The phase of the sonic displacement $\Delta$ is reversed in the second intensity pattern by pulsing the laser for $I_2$ at the phase of the sonic excitation signal opposite that used for $I_1$. Thus, the laser is pulsed forming a first intensity pattern $I_1$ at the face of the television camera described by the following equation:

$$I_1 = +\cos[k(l_2 - l_1) - 2k\Delta \sin[k(l_2 - l_1)]$$

The intensity of the first interference pattern $I_1$ is then read out of the vidicon camera to produce a first signal representative of the first intensity pattern $I_1$ which is stored in video storage device 31. The pulsed laser is then pulsed a second time at a phase of the sonic excitation signal input opposite that during the first pattern to produce a second intensity pattern $I_2$ at the face of the television camera described by $$I_2 = +\cos[k(l_2 - l_1)] + 2k\Delta \sin[k(l_2 - l_1)]$$

A second signal is read out of the vidicon camera 30 correspondong to the second intensity pattern $I_2$ which is stored in the video storage device.

In generating the signals corresponding to the first two intensity patterns no voltage is applied to the phase modulator 24 so that no phase shifts are introduced into the reference beam path. Two additional fields or intensity patterns are then produced on the vidicon camera but this time with a phase shift of $\theta = \pi/2$ introduced in the reference path by application of an appropriate DC voltage to the piezoelectric cyrstal stack 24 by signal generator 25. The laser 17 is then pulsed a third time producing a third interference pattern $I_3$ at the face of vidicon camera 30 described by the following equation:

$$I_3 = |+\cos[k(l_2 - l_1) - \pi/2] - 2k\Delta \sin[k(l_2 - l_1) - \pi/2]$$
$$= |+\sin[k(l_2 - l_1)] + 2k\Delta \cos[k(l_2 - l_1)]$$

A third signal corresponding to the third intensity pattern $I_3$ is read out of vidicon camera 30 and stored in the storage device 31. The laser is then pulsed a fourth time during the phase of the sonic excitation signal opposite that during illumination of the third intensity pattern (i.e., with the phase of the sonic placement $\Delta$ reversed) to form a fourth intensity pattern $I_4$ described by the following equation:

$$I_4 = |+\sin[k(l_2 - l_1)] - 2k\Delta \cos[k(l_2 - l_1)]$$

A fourth signal is thus read out of the television camera corresponding to the fourth intensity pattern $I_4$ and stored in the video storage device.

The four signals corresponding to the four intensity pattern components used in reconstructing an optical image of the acoustic wave field are then processed as follows. Difference signals corresponding to the difference between signals representing $I_2$ and $I_1$ are generated by difference amplifier 32 while difference signals generated by difference amplifier 33 represent the difference between signals $I_4$ and $I_3$. These signals are applied to multipliers 34 and 35 to generate signals representing the square of the difference between signals $I_2$ and $I_1$ and the difference between signals $I_4$ and $I_3$. Alternatively, difference signals $I_2 - I_1$ and $I_4 - I_3$ can be applied to appropriate square law devices to produce the squares of the signals. The difference signals described by the following equations, $$I_2 - I_1 = 4k\Delta \sin[k(l_2 - l_1)]$$

$$I_4 - I_3 = 4k\Delta \cos[k(l_2 - l_1)]$$

are thus squared and then applied to adder 36 to obtain the sum of the square of the difference signals which is the envelope of the desired signal containing the desired image information as described by the following equation:

$$(I_2 - I_1)^2 + (I_4 - I_3)^2 = (4k\Delta)^2$$

The final envelope signal is applied to an appropriate display device such as cathode ray tube 37.

In the system and method described with reference to FIG. 1, four input fields are required to produce one output field comprising the optical visualization of the acoustic wave fields. This can be accomplished by processing four signals from the video storage device representing the four component patterns as described above while four new patterns are being formed on the vidicon camera and stored in the video storage device. Alternatively, the four signals in the video storage device representing four interference patterns can be processed and applied to the CRT every time one of them is replaced by a new field. Thus, a new optical image is formed on the cathode ray tube screen each time one of the four signals in video storage device 31 is sequentially replaced by a new signal representing a new pattern on the vidicon camera. Assuming that only limited amounts of motion have taken place during the replacement of one field this replacement process will be adequate.

Figure 2:
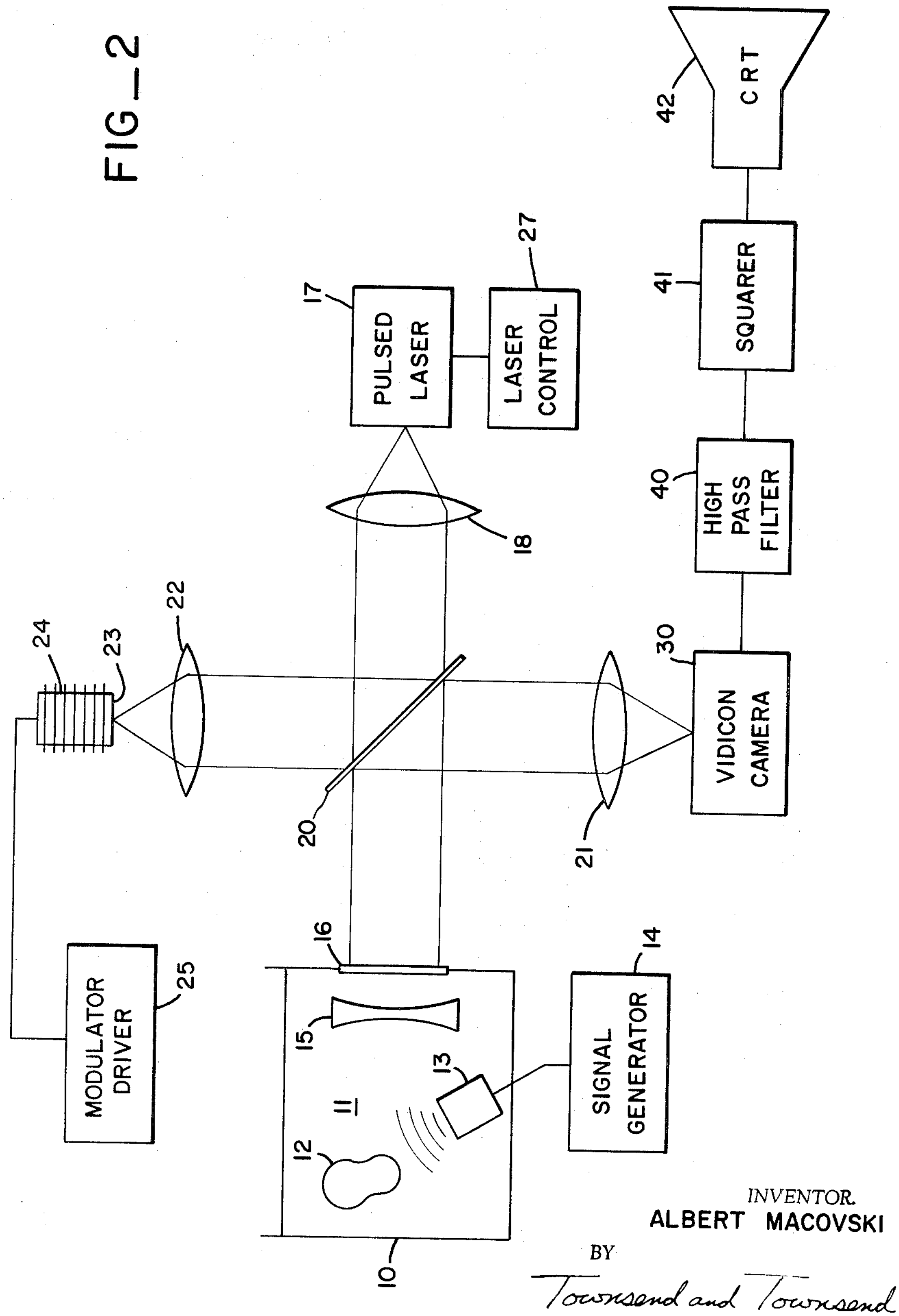
FIG. 2 is another block diagram of an acoustic to optical imaging system according to the first aspect of the invention in which the video storage device is eliminated.

A modified version of the system and method of FIG. 1 which permits construction of an optical image of the acoustic wave field without the use of the video storage device or video record and playback system is illustrated in FIG. 2. With corresponding elements of FIG. 2 numbered the same as in FIG. 1 and using the same equation notation, the intensity $I_1$ at the camera face place during a first flash of the pulsed laser 17 is given by the following equation:

$$I_1 = 1 + \cos[k(l_2 - l_1)] + 2k\Delta \sin[k(l_2 - l_1)]$$

As in the system of FIG. 1 the laser is pulsed for a duration small with respect to a cycle of the sonic excitation signal. With reference to FIG. 2 however the reference pathlength difference is changed by a half wavelength by application of a suitable DC voltage to piezoelectric crystal stack 24 before the second laser pulse. The laser is then pulsed a second time during the phase of the sound excitation signal opposite that of the first intensity pattern resulting in a second intensity distribution $I_2$ at the target of vidicon camera 30 given by the following equation:

$$I_2 = 1 - \cos[k(l_2 - l_1)] + 2k\Delta \sin[k(l_2 - l_1)]$$

Thus, the interference resulting from recombination of the object and reference beams themselves is reversed during the second pulse with respect to the first pulse, while the interference due to the sonic motion is the same due to the compensating reversal of the phase of the sonic excitation signal as between the first and second pulses. The two intensity distributions $I_1$ and $I_2$ are therefore summed on the face of the camera 30 producing the the following sum:

$$I_1 + I_2 = 2\{1 + 2k\Delta \sin[k(l_2 - l_1)]\}$$

The resulting combined pattern eliminates low frequency interference terms while still retaining the desired interference terms due to the sonic displacements $\Delta$ modulated by the path-length difference. The combined pattern $I_1 + I_2$ is then read out of the vidicon camera producing a first sum signal which is AC coupled by means of high pass filter 40. The filtered AC component is then squared by squarer or squaring circuit 41 and applied to cathode ray tube 42. The filtered squared signal $e_1$ applied to CRT 42 is represented as follows:

$$e_1 = 4k^2\Delta^2 \sin^2[k(l_2 - l_1)]$$

After the first two interference patterns produced by the first two laser pulses are read out of the vidicon camera, third and fourth interference patterns are similarly formed. Before the third and fourth laser pulses however, the reference beam pathlength difference or phase shift is initially adjusted or shifted by 90° by application of an appropriate voltage to the piezoelectric crystal stack 24. The laser is pulsed at a peak of the sonic excitation field appearing at surface 16 to obtain a third intensity distribution $I_3$ at the base of the camera described as follows:

$$I_3 = 1 + \sin[k(l_2 - l_1)] + 2k\Delta \cos[k(l_2 - l_1)]$$

The laser is pulsed for a fourth time with a half wavelength path difference introduced in the reference beam path length and with the pulse occurring during a polarity of the sonic excitation signal reversed from path during the third laser pulse. The fourth interference pattern $I_4$ resulting at the target of vidicon camera 30 is thus represented as follows:

$$I_4 = 1 - \sin[k(l_2 - l_1)] + 2k\Delta \cos[k(l_2 - l_1)]$$

The two patterns are summed at the face of the camera and the combined frames are defined by the following equation:

$$I_3 + I_4 = 2\{1 + 2k\Delta \cos[k(l_2 - l_1)]\}$$

The camera scan produces an output signal, AC coupled by means of high pass filter 40 which extracts the AC component, and the AC value is squared by squaring component 41. The squared AC component $e_2$ defined as follows, $$e_2 = 4k^2\Delta^2 \cos^2[k(l_2 - l_1)]$$

is applied to the cathode ray tube. Thus the two squared AC components $e_1$ and $e_2$ are sequentially applied to the cathode ray tube and the persistence of vision is sufficient to add the two components providing the resultant pattern $e_1 + e_2$ on the CRT screen defined by the following equation:

$$e_1 + e_2 = 4k^2\Delta^2[\sin^2\theta + \cos^2\theta] = 4k^2\Delta^2$$

Thus, the desired optical image of the acoustic field is constructed without using video storage devices. The only requirements are to pulse the laser during proper time sequence with the sonic excitation signal and to appropriately shift the phase of the optical reference beam between flashes in the manner described above.

Each of the foregoing embodiments has been described with reference to the use of a Twyman-Green-type interferometer for generating separate object and reference beams from the laser pulses and for recombining the object and reference beams to provide optical interference patterns and coding information about the acoustic wave field. Other interferometer arrangements can also be used however and by way of example a Mach-Zehnder type interferometer is incorporated in the next described embodiment.

According to a preferred system and method for visualizing acoustic images, the laser is pulsed to provide pulse durations of many cycles of the sonic excitation signal. In order to extract the desired image information from the resulting interference patterns, and reconstruct an image of the object, a frequency offset method is used in which the reference beam is cyclically temporally offset in phase to effectively frequency shift the reference beam at a frequency equal to the sonic signal.

Figure 3:
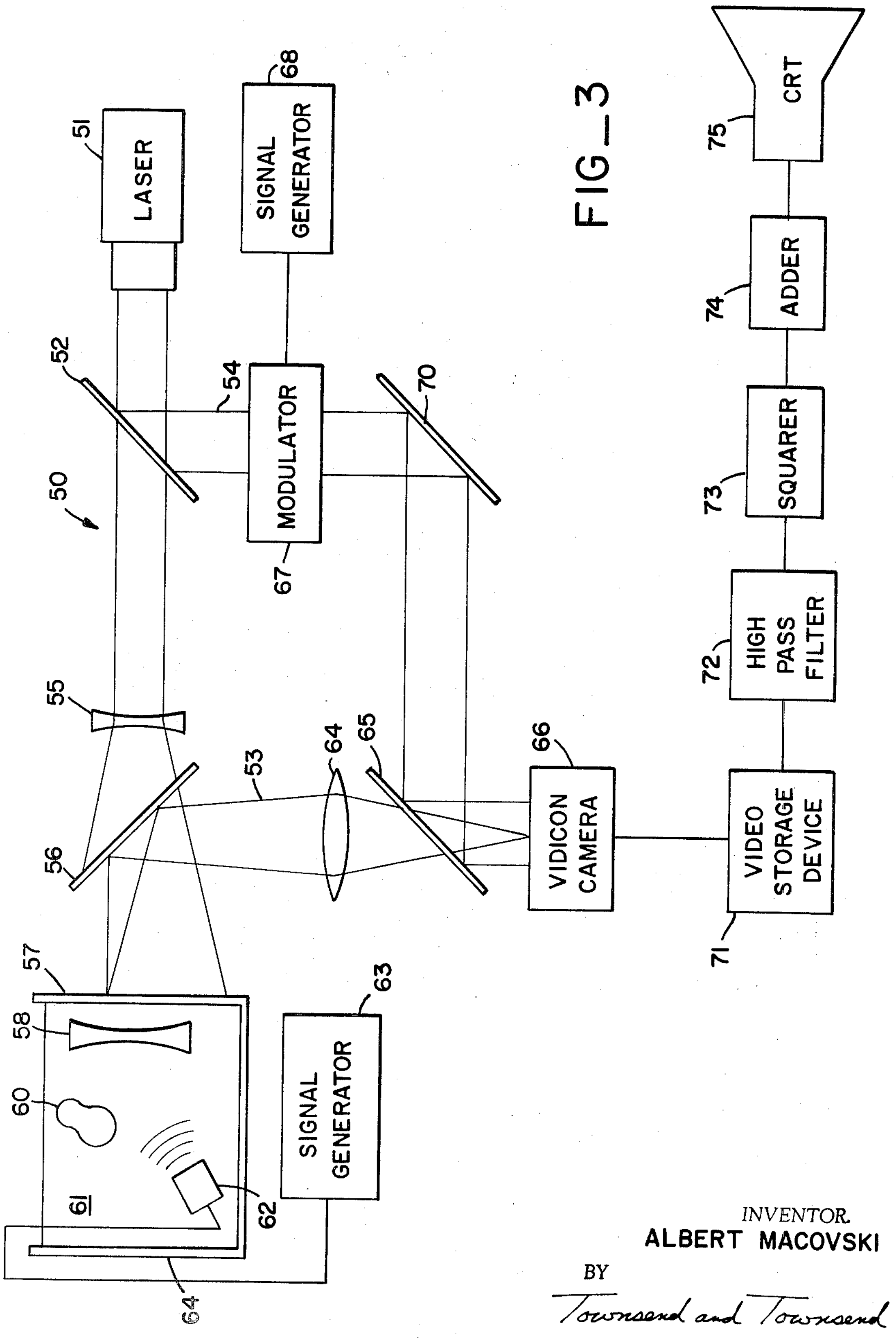
FIG. 3 is a block diagram of a system for visualizing acoustic images according to the second aspect of the invention using a video storage device.

As shown in FIG. 3 a Mach-Zehnder type interferometer 50 is used to generate an object and reference beam from pulsed laser source 51. The emerging laser beam pulse is divided at beam splitter 52 into the object beam 53 and reference beam 54. The object beam 53 is directed to lens 55 and beam splitter 56 which can be for example a half-silvered mirror, onto surface 57 which constitutes a reflective deformable surface upon which an acoustic wave field is impressed by acoustic lens 58. The acoustic wave field originates from an object 60 insonified by transducer 62 which is actuated by signal generator 63. The object 60 is immersed in an acoustically transmissive fluid 61, retained within container 64 in the manner heretofore described. The light reflected from surface 57 in accordance with the acoustic image pattern forms the object beam and is directed by beam splitter 56 through lens 64 and half-silvered mirror 65 onto the face or target of a vidicon camera or other storage-type television camera 66.

The reference beam of light diverted by beam splitter 52 is cyclically temporally offset in frequency by single side band modulator 67 driven by signal generator 68. The modulator 67 can be for example an electro-optic phase modulator having a sawtooth wave form input as more fully described in U.S. Pat. application Ser. No. 864,351 referred to above. The frequency shifted reference beam is deflected by mirror 70 to the beam splitter or half-silvered mirror 65 where it recombines with the object beam to form an interference pattern on the target of vidicon camera 66, according to the pattern of phase or pathlength differences from the common laser source introduced in the reference beam and object beam paths. Thus, a difference of pathlength of $\pi$radians or 0.3 microns, will change an area of the interference pattern from bright to dark. Thus, besides the interference due to motion of the surface 57 which describes the sonic field, the pattern includes components corresponding to the temporal frequency carrier upon which the interference due to acoustic vibration is superimposed.

In the method of operation of the system illustrated in FIG. 3 the laser is pulsed for a duration of many cycles of the sonic energy and the reference beam is offset in frequency by modulator 67 at the same frequency as the sonic source. The resultant intensity pattern $I$ on the face or photocathode target of camera 66 is given by the equation:

$$I = |e^{2k\,\Delta\ \cos wt} + e^{j(wt + \alpha)}|^2$$

where $\Delta$ is the displacement of the vibrating membrane or surface 57 and $\alpha$ is the phase difference over the photocathode face of the camera between the reference beam path and object beam path as a result of deformation at the surface 57. Thus, $\alpha = k(l_2 - l_1)$ where $l_1$ is the reference beam path length and $l_2$ is the optic beam path length. For $k\Delta << 1$ the above equation can be expanded:

$$I \cong 1 + \cos(wt+\alpha) + 2k\Delta \cos wt[\sin wt \cos\alpha + \cos wt \sin\alpha]$$

Integrating over many cycles of $w$ the sonic signal, at the storage surface of television camera 66 yields the following first integrated intensity pattern $\hat{I}_1$:

$$\hat{I}_1 = 1 + k\Delta \sin\alpha$$

The integrated intensity pattern $\hat{I}_1$ thus includes a constant term plus the desired displacement image $k\Delta$ multiplied by the sine of the random phase factor $\alpha$. One way of isolating the desired image information is to read out the integrated pattern from the television camera to provide a first signal stored in the video storage device 71 which can be for example a magnetic disc. A second integrated intensity pattern is formed on the face of vidicon camera 66 by switching the phase of the acoustic excitation signal 90° to the form $\Delta$ sin wt, and pulsing laser 51 a second time for a duration over many cycles of the sonic signal. The second resultant intensity pattern $\hat{I}_2$ integrated at the face of the camera is given as follows:

$$\hat{I}_2 = 1 + k\Delta \cos\alpha$$

A second signal is read out of the vidicon camera representing the intensity pattern and the two signals representing the two integrated intensity patterns are AC coupled by means of high pass filter 72 so that the time varying portion of each signal is squared by squaring circuit 73 which may include for example a square law device, and the squared signals are added by adder 74 to provide the signal $i_{out}$ of the following form:

$$i_{out} = (k\Delta \sin\alpha)^2 + (k\Delta \cos\alpha)^2 = k^2\Delta^2$$

This signal is the desired envelope signal representing the pattern of acoustic vibrations at surface 57 and therefore the desired image information for reconstructing an image of the immersed object 60. This signal is applied to an optical display such as cathode ray tube 75.

In order to eliminate the requirement for the video storage device 71 and adder 74, these two components 71 and 74 can be removed and the signals representing integrated intensity patterns $\hat{I}_1$ and $\hat{I}_2$ can be applied in sequence through the high pass filter 72 and squarer 73 to the cathode ray tube 75 where they are summed on the face of the cathode ray tube in a manner similar to that described with reference to the system of FIG. 2.

The foregoing frequency offset method, i.e., the method of using temporal cyclic frequency offset of the reference beam amounts to a technique for translating the reference wave to one of the sidebands created by the reflective vibrating surface at which the acoustic field is impressed. The interference fringes or patterns therefore occur only on the image information and these are shifted squared and summed in order to eliminate them. A feature and advantage of this arrangement is that only two frames of interference pattern components are required to be added in order to construct the final image. Thus, the desired picture is modulated by random interference fringes which are shifted, squared and summed to eliminate them and smooth them out. A cathode ray tube with long persistence screen such as for example one-fifteenth of a second frame is utilized.

Rather than offset the reference beam with frequency modulation in order to modulate the desired picture information on a temporal frequency carrier, the object beam and reference beam can be combined off-axis in order to superimpose the image information on a spatial frequency carrier as described in more detail with reference to FIG. 4.

According to this method for isolating the desired envelope term from the signal representing an integrated interference pattern from the television camera, the reference beam is brought into the camera at some angle $\theta$ with respect to the normal, i.e., by recombining the object beam and reference beam off-axis at an angle $\theta$ to superimpose the interference pattern on a spatial frequency carrier or grating. The angle $\alpha$ representing phase differences at the camera face between the reference and object beam paths, is defined as $\alpha = \omega_x x + \gamma$ *where* $\omega_x$, the spatial frequency of the grating in the $x$ direction is given by $\omega_x = 2\pi(\sin \theta/\lambda)$ and $\gamma$ is again a random phase factor based on path-length differences. The frequency of the spatial frequency carrier or grating $w_x$ is chosen to be at the edge of the resolution capability of the television camera used.

As shown in FIG. 4, the laser 80 is pulsed to provide a pulse duration over many cycles of the sonic signal originating from transducer 81. The acoustic wave field originating from insonified object 82 is focused by acoustic lens 83 and is impressed on the reflective deformable surface 84 illuminated by the object beam from pulsed laser 80. The reference beam passing through lens 85 is reflected by an angled retroreflecting mirror 86 so that the return reference beam returns at an angle to the normal defined by the screen of television camera 87. Thus, the reference beam and object beam combine off-axis to superimpose the resulting interference pattern on a spatial frequency grating whose frequency is determined by the angle $\theta$ between the axes of the reference and object beams.

The interference pattern over many cycles of the sonic signal is integrated at the face of the television camera 87 and the time varying or AC component of the television output signal is extracted by AC coupling 88, which is for example a high path filter, thereby eliminating the constant term so that the output signal $i_{out}$ is described as follows:

$$i_{out} = k\Delta \cos [v w_x t + \gamma]$$

The horizontal scan velocity is designated $v$. This signal is envelope detected to provide the signal $|k\Delta|$, the desired output representing the desired image information. This can be applied to an optical display such as cathode ray tube.

To achieve the maximum use of the resolution capability of the television camera the bandwidth of the output of the envelope detector should be made equal to that of the camera. This cannot be done directly because the spectrum of the modulated carrier and the baseband of the output signal will overlap. However, if the camera output is used to amplitude modulate a high frequency carrier, the filtered signal can then be modulated with full bandwidth as shown with reference to the remainder of FIG. 4 and the accompanying frequency bandwidth graphs **4*a* through 4*d*. The AC component of the television camera 87 extracted by high pass filter 88 and shown in graph 4*a* is used to modulate a high frequency signal $w_1$ by means of balanced modulator 90 the output of which is represented in graph 4*b*. By way of example, if the bandwidth of the television camera output $w_x$ is a 4 mc video signal, $w_1$ is conveniently chosen to be a frequency large compared to the bandwidth of the video signal, for example, 40 or 50 mc. By means of filter 91 the upper sideband of the balanced modulator output is filtered in a vestigial sideband arrangement and applied to the envelope detector 92 which envelope detects the high frequency signal to provide the output signal illustrated in graph 4*d*** representing the full bandwidth of the original video signal. This signal can be applied to an optical display such as a cathode ray tube display.

Each of the foregoing system embodiments have been described with reference to the use of an acoustic lens for imaging the field originating from the insonified object and thus has been described with reference to acoustic imaging of the object. Each of the systems is equally applicable however in acoustic holography in which the object is insonified by coherent acoustic energy and the acoustic lens is eliminated. Similarly, a variety of optical arrangements can be devised by generating the object and reference beams for recombination to provide the optical interference patterns.

In the claims:

1. A sonic image transducer of the type in which a sonic image of an object immersed in an acoustic medium and insonified by a sonic signal generator source is impressed on a reflective vibrating surface at a boundary of the acoustic medium and illuminated with an object beam of coherent light, and in which the reflected object beam is combined with a reference beam of coherent light to generate an optical interference pattern corresponding to the sonic image impressed at the reflective vibrating surface comprising:

a pulsed laser synchronized with the sonic signal generator source and means for controlling said pulsed laser so that it can be turned on either during a positive or negative peak of the sonic signal generated by said sonic source, each of the laser pulses from said pulsed laser being a small part of the cycle of the insonifying signal;

interferometer means for generating from said pulsed laser beams an object beam for illuminating the sonic image and a reference beam for combination with the object beam to form an optical interference pattern;

an optical modulator interposed in the reference beam path and means for actuating said light modulator to introduce selected phase shifts in the reference beam;

a storage-type television camera positioned to receive on the camera target the pulsed interference patterns produced by said combined object and reference beams;

a video storage device coupled to the output of said television camera;

a first difference amplifier coupled to the output of said video storage device for generating the difference of first and second signals corresponding to first and second intensities appearing on the camera face plate, said first and second signals corresponding to positive and negative peaks of the sonic signal with no phase shift introduced in the reference beam by the light modulator;

first multiplier means for squaring the difference between said first and second signals;

second difference amplifier means for generating the difference between third and fourth signals corresponding to third and fourth intensities appearing on the camera face plate, said third and fourth intensities corresponding to positive and negative peaks of the sonic signal with a phase shift of $\pi/2$ introduced by the light modulator in the reference beam;

second multiplier means for squaring the difference between said third and fourth signals;

an adder for adding the outputs from said first and second multipliers;

and a cathode ray tube display for applying the output from said adder comprising the envelope signal containing the desired image information.

2. A sonic image transducer as set forth in claim 1 wherein said provided means for pulsing the sonic signal generating source so that laser pulses and sonic pulses are coincident at the reflective vibrating surface.

3. An acoustic to optical image converting system of the type in which an acoustic field originating from an object insonified by a sonic signal generating source is impressed on a reflective vibrating surface and illuminated with an object beam of coherent light and in which the reflected object beam is combined with a reference beam of coherent light to generate an optical interference pattern corresponding to the acoustic field comprising:

a pulsed laser synchronized with the sonic signal generator source and means for controlling said pulsed laser to pulse either during a positive or negative peak of the sonic signal;

optical modulator means interposed in the reference beam path and means for driving said modulator to introduce selected phase shifts in the reference beam;

a storage-type television camera positioned to receive on the camera target the interference patterns produced by said combined object and reference beams;

a high pass filter coupled to the output of said television camera;

a squaring circuit coupled to the output of said high pass filter;

and a cathode ray tube display coupled to the output of said squaring circuit for summing and displaying squared signals received from the television camera.

4. An acoustic to optical image converting system as set forth in claim 3 wherein is provided means for pulsing the sonic signal generating source so that laser pulses and sonic pulses are coindicent at the reflective vibrating surface.

5. A system for visualizing acoustic images of the type in which an acoustic field originating from an object insonified by a sonic signal generating source is impressed on a reflective vibrating surface and illuminated with an object beam of coherent light and in which the reflective object beam is combined with a reference beam of coherent light to generate an optical interference pattern corresponding to the acoustic field comprising:

a pulsed laser and means for controlling said pulsed laser to produce a pulse duration of many cycles of the sonic signal generated by the sonic source;

optical modulator means interposed in the reference beam path and means for driving said modulator to cyclicly temporally offset the reference beam at a frequency substantially the same as the frequency of the sonic signal;

a storage-type television camera positioned to receive on the camera face the interference patterns produced by said combined object and reference beams and to integrate said interference patterns over many cycles of the sonic signal;

high pass filter means coupled to the output of said television camera for eliminating DC and constant signal components;

squaring circuit means coupled to the output of said high pass filter means;

and adder means coupled to the squaring circuit means thereby to isolate the desired envelope signal representing the acoustic image information.

6. A system for visualizing an acoustic image as set forth in claim 5 wherein a video storage device is interposed in the signal processing circuitry at the output of the vidicon camera.

7. A system for visualizing acoustic images as set forth in claim 5 wherein said adder means comprises cathode ray tube display means coupled to the output of the squaring circuit means.

8. A system for visualizing acoustic images as set forth in claim 5 wherein is provided means for pulsing the sonic signal generating source so that laser pulses and sonic pulses are coincident at the reflective vibrating surface.

9. An acoustic to optical image converting system of the type in which an acoustic field originating from an object insonified by a sonic signal generating source is impressed on a reflective vibrating surface and illuminated with an object beam of coherent light and in which the reflected object beam is combined with a reference beam of coherent light to generate an optical interference pattern corresponding to the acoustic field comprising;

a pulsed laser and means for controlling said laser to produce pulsed durations of many cycles of the sonic signal;

interferometer means for generating from the laser pulse beams an object beam and a reference beam, said interferometer constructed and arranged to provide off-axis recombination of the object beam reflected from the acoustic image and the reference beam thereby to modulate the optical interference pattern corresponding to the acoustic image on a spatial frequency carrier, the frequency of said spatial frequency carrier determined by the angle between the recombined off-axis reference and object beams;

a storage type television camera positioned to receive on the camera face the recombined object and reference beams, said interferometer arranged to combine the object and reference beams at an angle to generate a spatial frequency carrier having a frequency substantially at the resolution capability of the television camera;

high pass filter means coupled to the output of said storage type television camera for eliminating DC and constant signal components from the output;

and envelope detector means for detecting the envelope signal corresponding to the desired image information.

10. An acoustic to optical image converting system as set forth in claim 9 wherein said envelope detecting means comprises modulator means for amplitude modulating the filtered television camera on a high frequency carrier at least twice the band width of the television camera, filter means for filtering one of the side bands of the modulated signal, and detector means for envelope detecting the vestigial side band of said modulated signal.

11. An acoustic to optical image converting system as set forth in claim 9 wherein a video storage device is interposed in the signal processing circuitry coupled to the output of said television camera.

12. An acoustic to optical image converting system as set forth in claim 9 wherein is also provided an optical display means coupled to the output of said envelope detector means.

13. An acoustic to optical image converting system as set forth in claim 9 wherein is also provided means for pulsing the sonic source so that sonic pulses reflected from the object and laser pulses are coincident at the reflective vibrating surface.

14. A method of acoustic to optical image conversion using a sonic image transducer of the type in which an acoustic field originating from an object insonified by a sonic signal generating source is impressed on a reflective vibrating surface and illuminated with an object beam of coherent light and in which the object beam is combined with a reference beam of coherent light to generate an optical interference pattern corresponding to the acoustic image impressed at the reflective vibrating surface comprising:

pulsing the object beam in pulse durations lasting a fraction of a cycle of the insonifying signal and illuminating the acoustic image with a first pulse to produce a first intensity pattern;

projecting said first intensity pattern on the face plate of a storage-type television camera and reading out said first intensity pattern to provide a first signal;

storing said first signal;

illuminating said acoustic image with a second object beam pulse during a phase of the sonic signal opposite that during illumination by the first pulse to produce a second intensity pattern;

projecting said second intensity pattern on the camera face plate and reading out said pattern to form a second signal;

storing said second signal;

phase shifting the reference beam $\pi/2$;

illuminating said acoustic image with a third object beam pulse thereby to provide a third intensity pattern;

projecting said third intensity pattern on the camera face plate and reading out said pattern to produce a third signal;

storing said third signal;

illuminating said acoustic image with a fourth object beam pulse during a phase of the insonifying signal opposite that during illumination by the third pulse to form a fourth intensity pattern;

projecting said fourth intensity pattern on the camera face plate and reading out said fourth pattern to produce a fourth signal;

storing said fourth signal;

generating a first difference signal corresponding to the difference between the first and second signals;

squaring said first difference signal;

generating a second difference signal corresponding to the difference between the third and fourth signals;

squaring said second difference signal;

summing the squares of the first and second difference signals;

and applying the summed signal to a cathode ray tube display.

15. A method of acoustic to optical image conversion as set forth in claim 14 wherein is provided the step of pulsing the sonic signal generating source to produce sonic pulses coincidental with the laser pulses at the reflective vibrating surface.

16. A method of acoustic to optical image conversion using a sonic image transducer of the type in which an acoustic field originating from an object insonified by a sonic generating source is impressed on a reflective vibrating surface and illuminated with an object beam of coherent light and in which the object beam reflected from the acoustic image is combined with a reference beam of coherent light to generate an optical interference pattern corresponding to the sonic image comprising:

generating a first laser pulse having a duration of a fraction of the cycle of the insonifying signal and illuminating the acoustic image to form a first intensity pattern at the camera face plate;

shifting the path length of said reference beam by a half wavelength and illuminating the acoustic image with a second laser pulse at a time when the insonifying signal is of opposite polarity thereby generating a second intensity pattern on the camera face plate;

summing the first and second intensity patterns at the camera face plate and reading out a first signal corresponding to the sum of the first and second intensity patterns;

separating the AC component of said signal;

squaring said AC component to provide a first squared signal;

and applying said first squared signal to a cathode ray tube display;

shifting the phase of the reference beam by 90°;

illuminating the acoustic image with a third laser pulse;

shifting the reference beam by half a wavelength and illuminating the acoustic image with a fourth laser pulse at a time when the insonifying signal is of opposite polarity;

summing the third and fourth intensity patterns corresponding to the third and fourth laser pulses at the face plate of the television camera and reading out said patterns to produce a signal corresponding to the sum of the third and fourth intensity patterns;

separating the AC component of said signal;

squaring the AC component of said signal to provide a second squared signal;

applying said second squared signal to the cathode ray tube display;

and summing the first and second squared signals on the face of said cathode ray tube display.

17. A method of acoustic to optical image conversion as set forth in claim 16 wherein is provided the step of pulsing the sonic signal generating source to produce sonic pulses coincidental with the laser pulses at the reflective vibrating surface.

18. A method of acoustic to optical image conversion using a sonic image transducer of the type in which a sonic image originating from an object insonified by a sonic signal generating source is impressed on a reflective vibrating surface and illuminated with an object beam of coherent light and in which the object beam is combined with a reference beam of coherent light to generate an optical interference pattern corresponding to the sonic image comprising:

Shifting the reference beam at a frequency equal to the frequency of the insonifying signal thereby forming an interference pattern of the combined object and reference beams with an unmodulated portion due to the sonic signal;

projecting said interference pattern on the face plate of a storage-type television camera;

integrating the intensity patterns formed on the television camera over many cycles of the insonifying signal;

reading out said integrated pattern to generate a first signal;

shifting the phase of the insonifying signal by 90°;

integrating the patterns on the camera face plate over many cycles of the insonifying signal to produce a second integrated pattern;

reading out said second integrated pattern to provide a second signal;

squaring the time varying portion of each of the first and second signals;

and adding the squares of said first and second signals.

19. A method of acoustic to optical image conversion as set forth in claim 18 wherein is provided the step of storing the first and second signals read out from the television camera.

20. A method of acoustic to optical image conversion as set forth in claim 18 wherein the step of adding the squared signals comprises summing said squared signals of the face of a a cathode ray tube.

21. A method of acoustic to optical image conversion as set forth in claim 18 wherein is provided the step of pulsing the sonic signal generating course to produce sonic pulses coincidental with the laser pulses at the reflective vibrating surface.

22. A method of acoustic to optical image conversion using a sonic image transducer of the type in which a sonic image originating from an object insonified by a sonic signal generating source is impressed on a reflective vibrating surface and illuminated with an object beam of coherent light and in which the object beam is combined with a reference beam of coherent light to generate an optical interference pattern corresponding to the sonic image comprising:

aligning the object beam and reference beam at a slight angle with respect to each other thereby to modulate the optical interference pattern from the combined object and reference beams onto a spatial frequency carrier;

projecting the optical interference pattern and spatial frequency carrier onto the face plate of a storage-type television camera;

reading out an AC signal corresponding to the optical interference pattern and spatial carrier and eliminating constant components of the signal;

and envelope detecting the camera output signal to provide an envelope signal containing the desired image information.

23. A method of acoustic to optical image conversion as set forth in claim 22 wherein the step of envelope detecting the camera output signal comprises amplitude modulating a high frequency carrier with the television camera output, the frequency of said carrier being at least twice the camera video band width, filtering the upper band width of the modulated camera video output and detecting said filter signal.

24. A method of acoustic to optical image conversion as set forth in claim 22 wherein is provided the steps of pulsing the object beam and sonic signal so that the object beam pulses and sonic pulses are coincident at the reflective vibrating surface.

* * * * *